Figure 6:
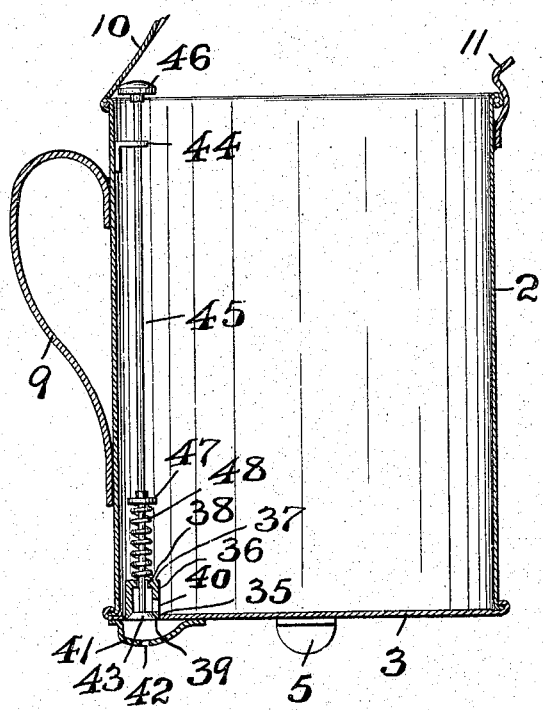

F. A. FELDKAMP.
EGG BOILING OR CODDLING UTENSIL.
APPLICATION FILED JUNE 24, 1913.
1,167,057.
Patented Jan. 4, 1916.
2 SHEETS—SHEET 1.
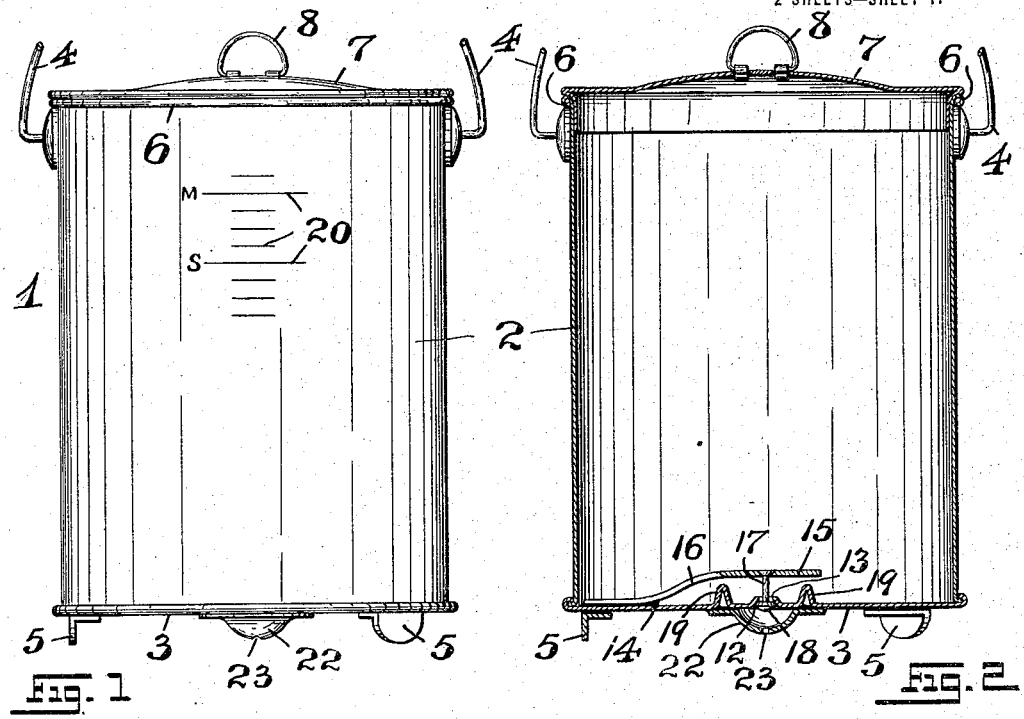
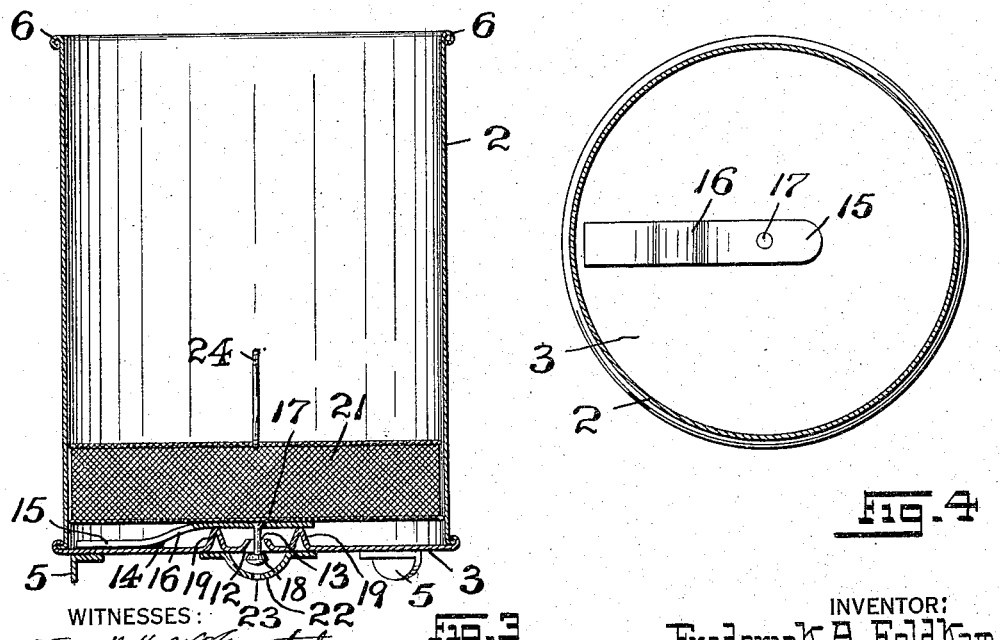
INVENTOR:
Frederick A. Feldkamp,
BY
Fraentzel and Richards,
ATTORNEYS F. A. FELDKAMP.
EGG BOILING OR CODDLING UTENSIL.
APPLICATION FILED JUNE 24, 1913.

1,167,057.

Patented Jan. 4, 1916.
2 SHEETS—SHEET 2.

WITNESSES:
Fredk. W. Fraentzel
Clayton S. Cadmus

INVENTOR:
Frederick A. Feldkamp,
BY
Fraentzel and Richards,
ATTORNEYS

UNITED STATES PATENT OFFICE.

FREDERICK A. FELDKAMP, OF NEWARK, NEW JERSEY.

EGG BOILING OR CODDLING UTENSIL.

1,167,057.          Specification of Letters Patent.          Patented Jan. 4, 1916.

Application filed June 24, 1913. Serial No. 775,459.

*To all whom it may concern:*

Be it known that I, FREDERICK A. FELDKAMP, a citizen of the United States, residing at Newark, in the county of Essex and State of New Jersey, have invented certain new and useful Improvements in Egg Boiling or Coddling Utensils, and do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in cooking utensils; and, the invention relates, more particularly, to a novel device or utensil for the coddling or boiling therein of eggs, either soft, medium or hard, without the necessity of placing the utensil over the fire of a cook-stove, or having to time the duration of the boiling of the eggs, the utensil being capable of use at one side away from the stove, and acting automatically in coddling or boiling the eggs which are subjected to a steaming process, rather than a boiling process.

The present invention has for its principal object to provide a novel, cheap, and simple construction of egg-boiling or coddling utensil for the purpose of subjecting the eggs which are placed in the utensil for a pre-determined time to the action of boiling water and steam, to render the eggs either hard, medium, or soft-boiled, or of any intermediate degree of consistency, and the device acting automatically and requiring no immediate attention or timing.

The invention has for its further object to provide in connection with the utensil or device, an automatically controlled outlet valve, which is normally held closed, and is operated by the weight of one or more eggs, or by the closing of a lid with which the utensil is provided, to permit the boiling water within the receptacle to regulably flow from the vessel, out of the opened valve, whereby the egg or eggs are desirably coddled or boiled.

Other objects of this invention not at this time more particularly enumerated will be clearly understood from the following detailed description of the present invention.

With the various objects of the present invention in view, the said invention consists, primarily, in the novel egg-boiling or coddling utensil or device hereinafter set forth; and, the invention consists, furthermore, in the novel arrangements and combinations of the various devices and parts, as well as in the details of the construction of the same, all of which will be more fully described in the following specification and then finally embodied in the clauses of the claims which are appended to and which form an essential part of this specification.

The invention is clearly illustrated in the accompanying drawings, in which:—

Figure 5:
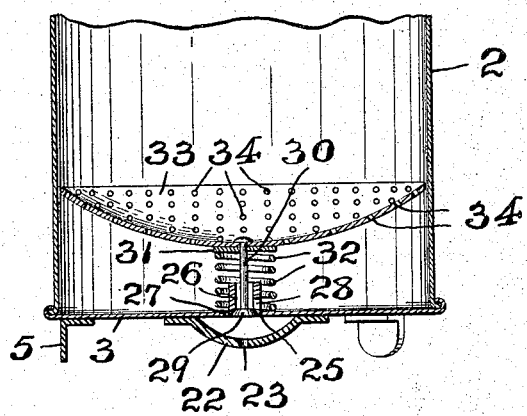

Figure 1 is a front-elevation, and Fig. 2 a transverse vertical section of an egg-boiling or coddling utensil, showing one embodiment of the principles of the present invention, the out-flow valve is said Fig. 2 being represented in its normally closed position. Fig. 3 is a transverse sectional representation of the utensil and device, with a wire-woven or analogous basket, in which one or more eggs are to be placed, inserted in the utensil and resting upon the spring-controlled valve-stem, whereby the valve is unseated, to permit of a gradual or regulated outflow of the boiling water; and Fig. 4 is a top view of the utensil, with the lid or cover and the said basket omitted from said view. Figs. 5 and 6 are two transverse sectional representations of two slightly modified forms of egg-boiling or coddling utensils, but still embodying the principles of the present invention.

Similar characters of reference are employed in all of the above described views, to indicate corresponding parts.

Referring now to the several figures of the drawings, the reference-character 1 indicates the complete egg-boiling or coddling utensil or device, the same consisting of a suitable receptacle, as 2, of any suitable design, and which is formed with a bottom 3 and may be provided with a handle or bail, as 4. The said bottom 3 is provided with any usual arrangement of feet or standards, as 5, and arranged upon the upper marginal bead-like edge 6 of the receptacle, there may be a removable lid or cover 7 which is provided with a suitable finger-piece, as 8, as indicated in Figs. 1 and 2 of the drawings, or the said receptacle may be provided upon one side with a handle, as 9, and a lid 10 hinged upon the upper open portion of the receptacle, the lid being retained in its closed position by means of a suitable spring-catch 11 which is suitably secured to the receptacle 2, substantially as illustrated in Fig. 2 of the drawings.

Referring now to Figs. 1 to 4 inclusive, it will be seen that the bottom 3 of the receptacle is provided with a preferably centrally disposed and inwardly extending cone-shaped valve-seat, as 12, the upper part of which is formed with a perforation 13. Suitably secured upon the upper surface of said bottom 3, by means of solder 14, or in any other suitable manner, is a flat spring-element 15, bent substantially, as at 16, and rigidly secured to said spring-element and extending downwardly therefrom is a valve-stem 17. This valve-stem extends into and through the previously-mentioned perforation 13, being loosely and movably disposed in said perforation, and connected with the lower free end-portion of said stem 17 is a cone-shaped valve, as 18, which under normal conditions is caused by means of said spring-element and the said stem 17 to be seated upon the valve-seat 12, so as to fully close the perforation 13, and thereby prevent the water from flowing from within the receptacle 2, as will be clearly evident. To limit the downward movement of the spring-element 15 when a weight is placed thereon, the bottom 3 of the receptacle 2 is formed with suitably disposed and inwardly extending projections or stop-lugs, as 19, the purpose of which will be clearly understood from an inspection of said Figs. 2 and 3 of the drawings. Upon its surface, the receptacle 2 is provided with a series of graduations, as 20, two of which may be provided with the letters M and S, respectively indicating the words medium and soft. In order that a regulable outflow of water may be had from the receptacle 2 when the valve 18 has been forced from the valve-seat 12, by the combined weight of a suitable basket or tray 21, and the egg or eggs which have been previously placed therein, there is suitably secured to the lower surface of the bottom 3 a cup-shaped shell, as 22, or other suitably formed regulating element, which is located directly beneath the valve 18, and is formed with an opening or hole 23, of such size that the outflow of the water is regulated, so as to produce the desired egg-boiling or coddling results. The previously-mentioned basket or tray is also provided with a suitable handle or bail, as 24, for placing the basket or tray into the water in the receptacle, or for removing it therefrom after the water has flowed from the opened valve and the egg or eggs have been desirably boiled or coddled.

The operation of the device, briefly, is as follows:—Boiling water is placed in the receptacle 2 to the desired height indicated by the graduations 20, the water being retained in the receptacle by the spring-controlled and normally closed valve 18, as will be clearly evident. The basket or tray 21, in which has been placed the egg or eggs which are to be boiled, is inserted into the receptacle 2, until it rests upon the spring-element 15 and the valve-stem 17 connected therewith. The lid or cover 7 is now placed upon the receptacle 21 so as to retain the heat and steam within the receptacle, and the valve 18 having been unseated, as previously stated, the hot water is permitted to flow from the receptacle 2 into the regulating element 22, out of which it passes through the hole or perforation 23. As soon as the water has entirely passed out of the receptacle 2, the egg or eggs have been properly boiled or coddled, and by taking off the cover or lid 7, can be removed by the withdrawal of the basket or tray 21 from within the receptacle 2. As soon as the weight is removed from the spring-element 15, the valve 18 is again automatically seated upon its valve-seat, whereupon the device is again ready for its next boiling or coddling operation.

In Fig. 5 of the drawings, the bottom 3 of the receptacle 2 is provided with an opening 25, in which is inserted and suitably secured the tubular element 26 provided with the valve-seat 27, the valve-disk 29 and valve-stem 30, the latter extending through the tubular element 26 and terminating above the upper open end-portion of said tubular element. The said tubular element 26 is also provided in its side with a drainage opening 28, the valve-stem 30 having secured thereto a disk or plate 31, and a coiled spring 32 being employed for normally closing the valve-disk, in the manner previously stated. In this egg-boiling or coddling device, there is also secured to the lower surface of the bottom 3 a cup-shaped shell or regulating element 22 formed with an opening or hole 23 for regulating the outflow of the water when the valve-disk 29 has moved from its valve-seat, the said regulating element operating in the manner and for the purposes stated in connection with the regulating device illustrated in connection with the construction of egg-boiling or coddling utensil represented in Figs. 1, 2 and 3 of the drawings. In lieu of the removable egg-carrying basket or tray 21, there may be permanently secured upon the upper end-portion of the valve-stem 30, a concave disk or egg-receiving element, as 33, for the reception of an egg or eggs, said element being also provided with a plurality of perforations 34, or other suitable means for permitting a quick and easy flow of water from the upper part of the receptacle into the lower part thereof, so that there will be no obstruction to the outflow of the water when the valve has been unseated by the placing of an egg or eggs in the receiving element 33.

In the form of egg-boiling or coddling device represented in Fig. 6 of the drawings, the bottom 3 of the receptacle 2 is provided at one side with a suitable opening, as 35, in which is inserted and suitably secured a tubular element 36 provided with a closed top 37 having a rod-guiding opening 38, and its other end being made with a cone-shaped valve-seat 39. The said tubular element 36 is also provided in its side with a drainage opening 40, and suitably secured to the lower outer face of the bottom 3, and directly beneath the outlet formed by the valve-seat, is a cup-shaped regulating element 41 formed with an opening or hole 42 of the proper size, that the outflow of the water is regulated, so as to produce the desired egg-boiling or coddling results. Seated upon the valve-seat 39 is a valve-disk 43, with which is suitably connected, and extends through the guiding opening 38 and through a suitable opening in a bracket 44 which extends from the side of the receptacle upon the inner portion thereof, a rod 45. This rod is provided upon its upper end, and slightly above the upper marginal edge of the receptacle 2, with a button or enlargement, as 46, a portion of which is constantly in engagement with a portion of the lower face of the previously mentioned hinged lid or cover 10, as will be clearly evident from an inspection of said Fig. 6 of the drawings. Suitably mounted upon said rod 45 is a collar, as 47, and encircling said rod 45, between the said collar 47 and the closed top 37 of the element 36 is a coiled spring 48, the purposes of which is to cause the valve-disk 43 connected with said rod 45 to be seated upon the valve-seat 39, and to normally bring the rod 45 and its button or enlargement 46 into the position represented in said Fig. 6 of the drawings, whereby the lid or cover 10 is also retained in its raised relation to the receptacle 2, as will be clearly evident.

When it is desired to boil or coddle an egg or eggs, the receptacle 2 is filled to the desired height with hot water, and the egg or eggs are placed in the water in the receptacle. Immediately the lid or cover 10 is closed down upon the top of the receptacle 2, the lid or cover being held in its closed relation by engagement with the spring-catch 11. The closing action of the lid or cover 10 upon the button or enlargement 46 of the rod 45, moves the latter in a downward direction, against the tension of the spring 48, whereby the valve-disk 43 is moved from its closing position upon the valve-seat 39, so that the water will flow from within the receptacle 2 into the regulating element 41 and out of the outflow opening or hole 42, gradually, and when finally all water has passed from the receptacle 2, the egg or eggs have been properly boiled or coddled to the desired degree, according to the quantity of hot water originally contained in the receptacle.

It will be evident, that the wire-mesh egg-receiving basket illustrated in Fig. 3 of the drawings, as well as the perforated egg-receiving elements shown in Fig. 6 of the drawings, will act as suitable strainers in case an egg cracks during the boiling operation and the "white" from the egg passes into the water, to prevent clogging of the out-flow means in the bottom of the receptacle.

From the foregoing description of the present invention it will be clearly understood that I have devised a simple, useful, and efficiently operating device for boiling or coddling eggs to any desired degree of consistency, from very soft to very hard, the boiling or coddling of the eggs being done off the range or stove and automatically, so that the eggs will not be underdone or overdone; and furthermore, there will be no necessary watching and timing the cooking operation, and a person will not be compelled to stand beside a hot fire.

I am aware that changes may be made in the general arrangements and combinations of the several devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the various devices and parts as described in the said specification, nor do I confine myself to the exact details of the construction of the said parts as illustrated in the accompanying drawings.

I claim:—

1. An egg-boiling or coddling utensil comprising a receptacle adapted to receive a graduated quantity of boiling water, an outflow opening in the bottom of said receptacle, said opening being formed with a valve-seat, a valve-disk normally seated upon said valve-seat, a valve-stem extending from said valve-disk, a spring connected with said valve-stem for seating said valve-disk, means coöperating with said spring-controlled valve-stem for unseating the normally closed valve-disk, and a cup-shaped flow-regulating element upon the outer surface of the bottom of said receptacle, said regulating element being provided with a perforation.

2. An egg-boiling or coddling utensil comprising a receptacle adapted to receive a graduated quantity of boiling water, an outflow opening in the bottom of said receptacle, said opening being formed with a valve-seat, a valve-disk normally seated upon said valve-seat, a valve-stem extending from said valve-disk, a spring connected with said valve-stem for seating said valve-disk, an egg-receiving tray coöperating with said spring-controlled valve-stem for unseating the normally closed valve-disk, and a cup-shaped flow-regulating element upon the outer surface of the bottom of said receptacle, said regulating element being provided with a perforation.

3. An egg-boiling or coddling utensil comprising a receptacle adapted to receive a graduated quantity of boiling water, an opening in the bottom of said receptacle, a tubular outflow element within said receptacle having its one end-portion extending into and secured in said opening, and formed in said end-portion with a valve-seat, a valve-disk normally seated upon said valve-seat, a valve-stem extending from said valve-disk into and through the said tubular outflow element, a spring encircling a portion of said tubular element and the valve-stem for seating said valve-disk, means coöperating with said spring-controlled valve-stem for unseating the normally closed valve-disk, and a cup-shaped flow-regulating element upon the outer surface of the bottom of said receptacle, said regulating element being provided with a perforation.

4. An egg-boiling or coddling utensil comprising a receptacle adapted to receive a graduated quantity of boiling water, an opening in the bottom of said receptacle, a tubular outflow element within said receptacle having its one end-portion extending into and secured in said opening, and formed in said end-portion with a valve-seat, a valve-disk normally seated upon said valve-seat, a valve-stem extending from said valve-disk into and through the said tubular outflow element, a spring encircling a portion of said tubular element and the valve-stem for seating said valve-disk, an egg-receiving tray coöperating with said spring-controlled valve-stem for unseating the normally closed valve-disk, and a cup-shaped flow-regulating element upon the outer surface of the bottom of said receptacle, said regulating element being provided with a perforation.

In testimony, that I claim the invention set forth above I have hereunto set my hand this 20th day of June, 1913.

FREDERICK A. FELDKAMP.

Witnesses:
FREDK. C. FRAENTZEL,
FREDK. H. W. FRAENTZEL.